Figure 1:
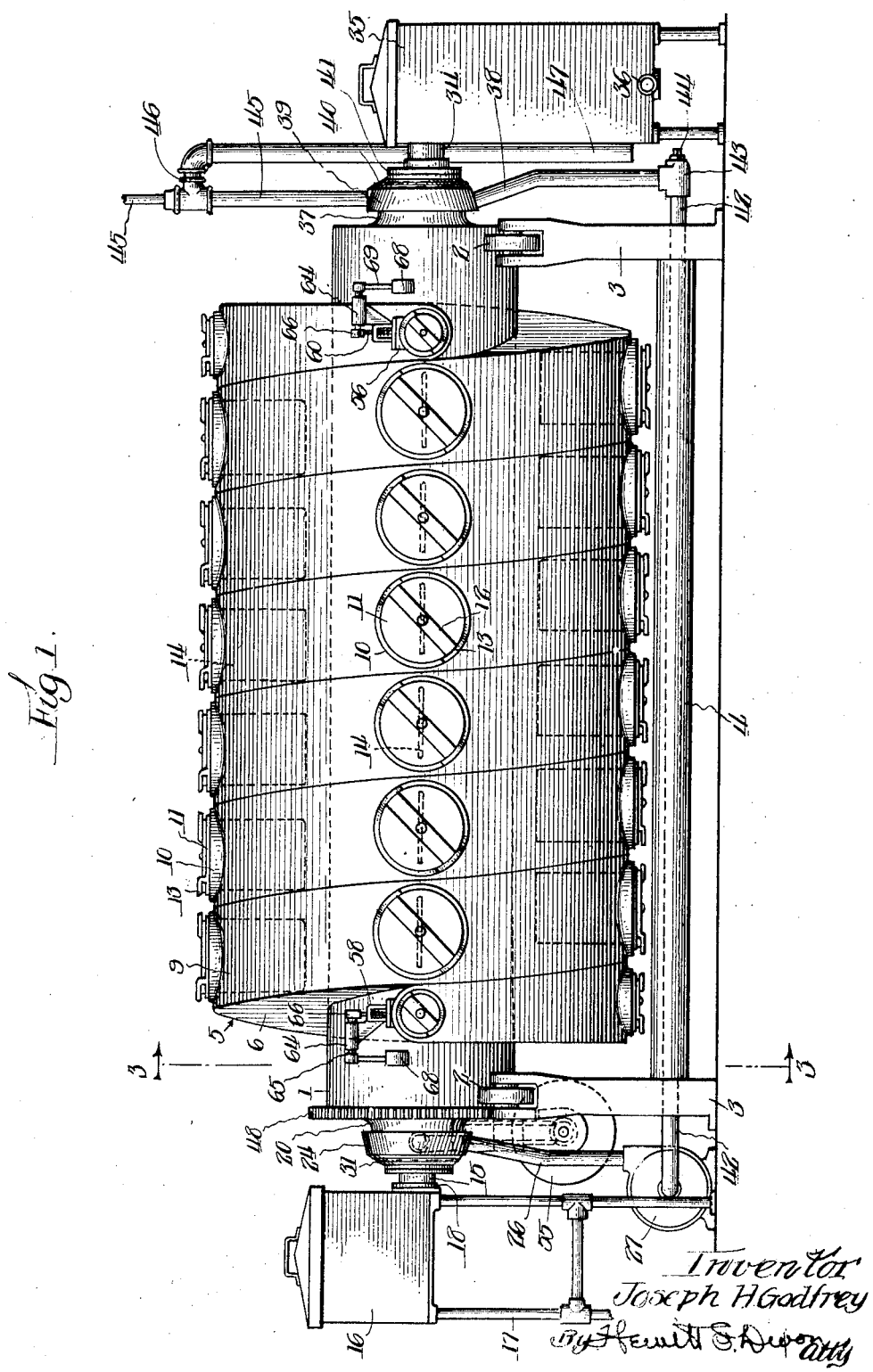

Nov. 5, 1929.  J. H. GODFREY  1,734,570
PASTEURIZING APPARATUS
Filed Nov. 11, 1926   3 Sheets-Sheet 1

Inventor
Joseph H Godfrey

Nov. 5, 1929.   J. H. GODFREY   1,734,570
PASTEURIZING APPARATUS
Filed Nov. 11, 1926   3 Sheets-Sheet 2
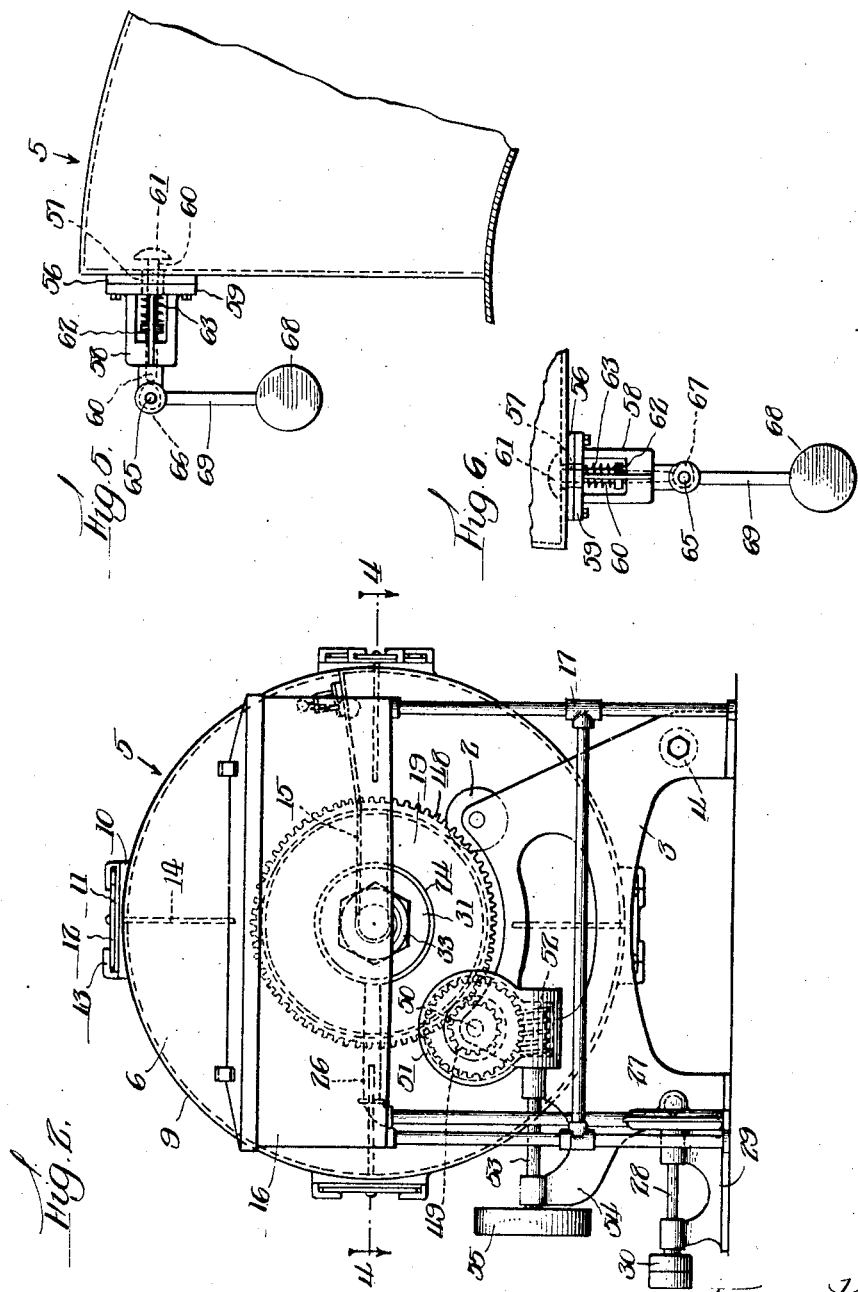
Inventor:
Joseph H. Godfrey,

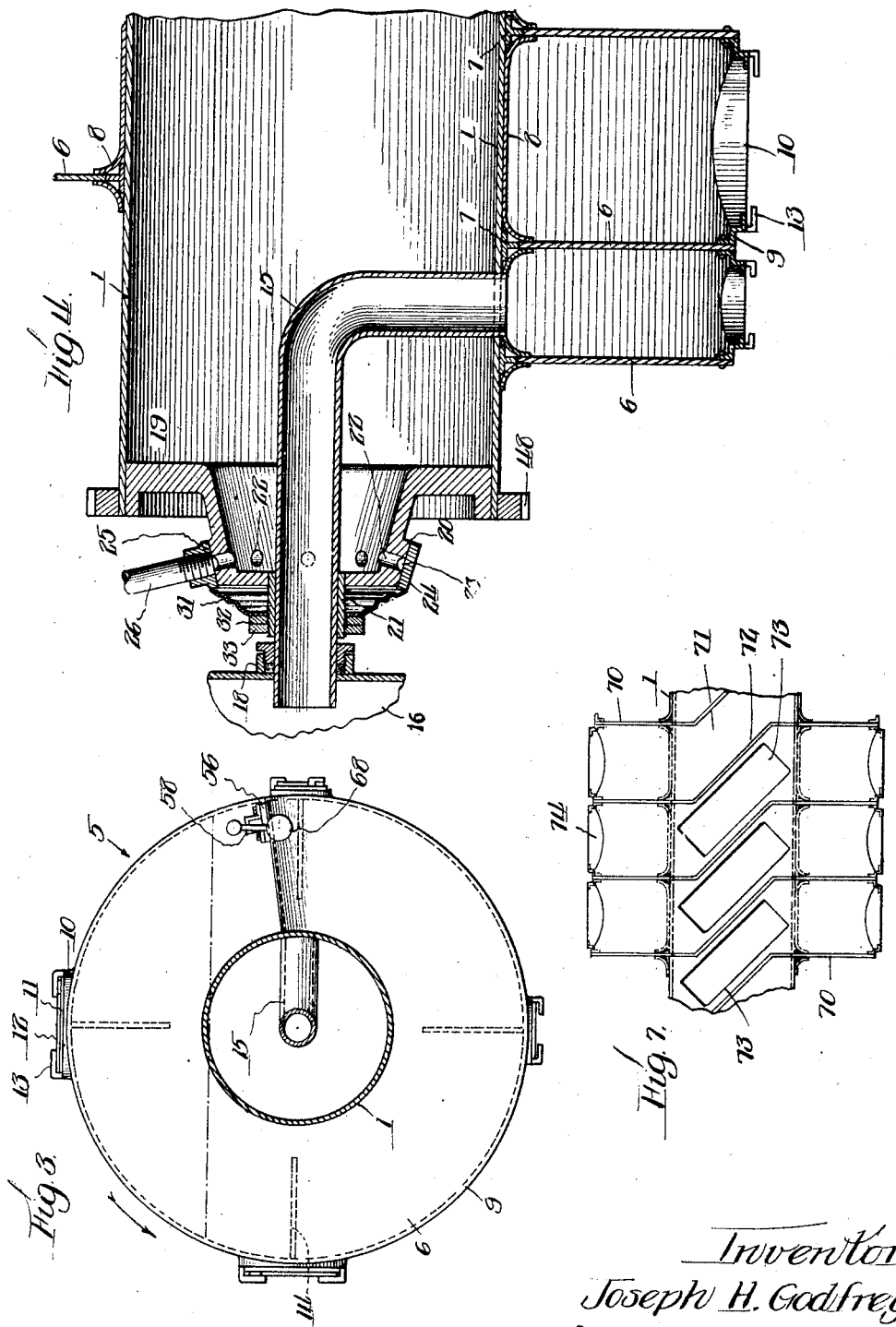

Patented Nov. 5, 1929

1,734,570

UNITED STATES PATENT OFFICE

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS

PASTEURIZING APPARATUS

Application filed November 11, 1926. Serial No. 147,738.

The invention relates more particularly to pasteurizing apparatus adapted for the treatment of edible fluids such as milk.

In milk pasteurization the commonly practiced method is to treat quantities of the milk at a pre-determined temperature for a pre-determined time in suitable containers or conduits. When holding containers are used they are filled with the liquid which is held for the required time and then emptied, the filling and emptying being controlled by valves. It will be obvious that any leakage or failure in these valves, permitting the uncontrolled flow to or from the container of a quantity of milk which has not been properly treated, introduces the danger of reinoculation by the undestroyed bacteria in the milk which has escaped the prescribed treatment, when intermixed with that which has been properly pasteurized. The continuous flow type of pasteurizing apparatus, where a continuous stream of the liquid is slowly conducted through relatively large heated conduits, is incapable of positive control to the end that every part of the liquid is treated at the required temperature for the required time, this being occasioned by the more rapid flow of liquid currents within the larger stream, thus being short of the required time for the destruction of bacteria, or the retardation and over-treatment of quantities lying or moving out of the direct current.

It is the principal object of this invention to provide pasteurizing apparatus which is devoid of either of the objectionable features of the types mentioned, which enables its use with a continuously flowing supply of milk, which positively determines the exact period of time that all portions of the milk is treated, and which accomplishes this end without the use of any valves controlling the flow of the liquid.

Further objects are to provide improved means for agitating the liquid under treatment, to provide for the separation into batches of quantities of milk in continuous movement, and to provide improved means for circulating the heating medium by which the milk is treated.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Reference is made also to my co-pending application Serial No. 214,624 filed August 22, 1927 which is a continuation in part of this application.

Referring to the drawings, Fig. 1 is a side elevation of the complete apparatus. Fig. 2 is an end elevation of the same. Fig. 3 is a cross sectional view taken on the plane of the line 3—3 in Fig. 1. Fig. 4 is a fractional sectional plan of the construction of the milk and water inlet mechanism, taken on the plane of the line 4—4 in Fig. 2. Figs. 5 and 6 are detailed views of the air inlet automatic valve. Fig. 7 is a fractional elevation of a modified form of the conduit construction.

Stated generally, the apparatus comprises a series of conduit coils preferably interconnected in helical form and disposed around a central drum in which is contained a heat exchange medium of regulated temperature, the drum and conduit rotating on a horizontal axis as a unit. The milk is preferably pre-heated by other means to approximately the required temperature for treatment, and then is introduced into the coils in successive batches to a level below the upper path of travel of the coils so that there is no intermixture between the batches in passing through the apparatus. The period of time for which each batch is held in the coils, in passing through the apparatus at the maintained regulated temperature, is positively and accurately determined by the speed of rotation of the coils, which are operated by regulated mechanical means.

More specifically described, the numeral 1 indicates a preferably cylindrical drum of rigid structure which is supported at each end for rotation on a horizontal axis by rollers 2, pivoted in standards 3, interconnected and supported by bars 4. About the drum 1 is mounted a preferably helical coil designated generally by the numeral 5 and comprising the side walls 6 extending in radial direction from the axis of the drum and secured to the latter in spaced helical relation extending from adjacent one end to near the other end of the drum 1. A preferred construction illustrated in Fig. 4 includes a T-shaped bar 7 suitably secured to the drum and upon which the side plates 6 are set, the spaced plates being interconnected about the drum with bottom plates 8 having their edges rounded into contact with the side plates 6. The bottom and side plates are preferably of material which is non-corrosive under the action of milk and are suitably joined at their contact edges. The side plates are outwardly joined by top plates 9 of similar material and extending the length of the coils to form a continuous enclosed conduit.

Hand hole openings having conventional marginal collars 10 are preferably provided at periodic intervals in the outer plate 9, for the purpose of affording access to the interior of the coils to clean and sterilize them after their operative use. The hand hole openings are normally closed by removable covers 11, preferably secured in position by pivoted bars 12 swingable into securing relation beneath laterally extending lugs 13 carried on the margins of the hand hole openings.

To afford agitation of the liquid passing through the conduit, there is attached to each of the covers 11 a vane or blade 14 extending into the conduit, its edges being in spaced relation to the sides and bottoms of the conduit coils. These vanes or blades pass through the body of milk contained in the lower turns of the coils as the latter are rotated.

The liquid milk is admitted to the inlet end of the conduit by means of a tube 15 which opens through the wall of the drum 1 and the bottom wall 8 of the conduit, and extends radially inward to the center of the drum where the tube 15 bends in an axial direction and extends a substantial distance outwardly of the end of the drum. The outer end of the tube 15 is operatively journaled in the lower portion of the side wall of a reservoir 16 supported on the standard 17 and adapted to receive a supply of milk for treatment in the apparatus. In operation, a supply of milk is maintained in this reservoir by means of controlled piping connections with the major supply of milk which preferably has been heated to the approximate holding temperature immediately before and is ready to be subjected to the holding treatment, the level of milk in the reservoir being controlled to a point below the level of the bottom wall of the conduit coils when the latter are in uppermost position. The opening through which the tube 15 enters the side wall of the reservoir 16 is preferably provided with a conventional packing gland indicated at 18.

The axial portion of the tube 15 is supported in the end wall 19 of the drum, as more particularly disclosed in Fig. 4. The end wall 19, suitably secured to the cylindrical wall of the drum, forms an end closure therefor and is provided centrally with a truncated cone portion 20 which carries an axially supported sleeve 21 within which the tube 15 is supported, the joints between the end wall, the tube and the drum wall being sealed in suitable manner.

The conical portion 20 of the end wall is provided with a series of radially opening ports 22 for the admission of the heating medium, preferably hot water, to the interior of the drum. The ports 22 are outwardly connected by an annular channel 23 running about the outer periphery of the conical portion 20. The outer periphery of the conical portion 20 also serves as a seat for a stationary channel-closing band or casing 24, within which the truncated conical portion revolves. The casing 24 is provided with a lateral opening 25 within which is attached a pipe 26, the latter connecting with a pump 27 adapted to deliver the heating medium to the interior of the drum. The pump 27 is illustrated as of the rotary type, having a shaft 28 supported in a base 29 and carrying a pulley 30 for belt power.

The casing 24 is maintained in operative relation, preferably by means of a resilient retaining disc 31 secured in position against the casing by a nut 32 screw-threaded upon the outer end portion of the sleeve 21 and locked in relation to the latter by means of a lock nut 33, thus permitting the retaining nut 32 to rotate with the tube and drum structure in operative bearing against the retaining disc 31.

The rear or discharge end of the conduit 5 and rear end of the drum 1 are similarly constructed, there being a tube 34 axially positioned in the rear end wall of the drum and having a radial extension in communication with the discharge end of the conduit 5, the outer end of the tube extending through the side wall of a receptacle 35 into which is delivered the treated milk, the receptacle 35 having a bottom connection 36 for piping for drawing off the treated milk. The rear end wall structure is similarly provided with a truncated conical portion 37 centrally positioned and having outlet ports, similar to those described at the inlet end, communicating through a similar outer peripheral channel with an outlet pipe 38 connected with an outlet opening in the stationary closure band or casing 39, similarly supported by a resilient disc 40 held in position by the pair of nuts 41. The outlet pipe 38 is connected through a return pipe 42 to the inlet of the pump 27.

Suitable means for introducing a regulated supply of steam for heating the water in circulation through the drum to the maintained temperature is preferably provided in association with a fitting 43 positioned at the junction of the outlet and return pipes and having an outer connection 44 for a steam line. Water is introduced into the drum and its outer circulating connections by a pipe 45 preferably connected through the upper portion of the casing 39 and having an overflow outlet 46 connected thereto substantially above the uppermost portion of the drum 1, the overflow outlet for convenience having connected thereto an open-ended down pipe 47.

The rotation of the drum and its supported conduit may be accomplished by any suitable mechanical means, that herein disclosed comprising a gear ring 48 mounted on one end of the drum, with which is engaged a driving pinion 49 carried by a shaft 50 which also carries a gear 51 in driven engagement with a worm 52 mounted on a shaft 53 suitably supported in the bracket 54 and having a pulley 55 adapted for belt connection with power means. The speed of rotation of the drum obviously may be regulated to any desired rate through the ratio of size of the pulley 55 to the driving pulley to which it is belted.

In the operation of the structure hereinbefore described, it will be apparent that when the opening between the front end turn of the conduit and the radially extending portion of the inlet tube 15, in its rotation with the drum, passes below the level of the liquid in the reservoir 16, the liquid in the latter will immediately begin to flow by gravity through the inlet tube and into the conduit and will so continue to flow while the inlet opening to the end turn of the conduit is passing through the lower portion of its arc of movement, and until it reaches again the level of the milk in the reservoir in its upward movement. Thereupon the liquid ceases to flow from the reservoir, and the first coil chamber of the conduit is filled with a batch of the milk to a level substantially below the top of the uppermost side of the drum.

The further movement of the end of the conduit, in rotation through the upper portion of its arc of movement away from the level of the batch of milk just admitted, necessitates the admission of air to the space between the rotating end of the conduit and the milk so that the latter may rest in the lower turn of the coil and progress through the successive coils of the rotating conduit at gravity level. This is accomplished preferably by means of an automatically operated air valve which is arranged to open when the milk ceases to flow into the conduit and to close just before the milk begins to flow in the succeeding batch. It will be apparent also that it is necessary to provide for the escape of the air between the successive batches when the latter reach the discharge end of the conduit, so that the milk will follow into the extreme rear end turn of the conduit for discharge through the outlet pipe 34.

A valve structure, suitably adapted to control the admission and discharge of the air as described, is illustrated in Figs. 5 and 6, and comprises a plate 56 fixed upon the end wall of the end coil of the conduit, through which and the conduit wall is provided a port opening 57. Mounted on the plate 56 is a bracket 58 having a flanged base portion 59 preferably bolted to the plate 56 and provided with an opening in continuation of the air port 57. Supported in the bracket 58 is a reciprocating stem 60 of substantially less diameter than the port opening 57, the stem extending through the latter opening and inwardly carrying a valve head 61.

The stem 60 is preferably provided with a fixed collar 62 between which and the base flange 59 is confined a coiled spring 63 normally tending to hold the valve head in abutment with the end wall of the conduit in closure of the air port opening 57. An outer extension of the bracket 58 provides a bearing 64 in which is operatively supported a shaft 65 carrying a cam 66 having a lobe 67 adapted to engage the outer end of the stem 60 and force the valve head 61 from its seat to open the air port 57. The cam 66 is controlled by a weight 68 carried by a connecting rod 69 secured to the outer end of the shaft 65. The cam 66 and weight 68 are arranged in such relation that the cam lobe 67 operates to open the air port as the inlet and outlet pipes 15 and 34 leave the liquid level in their upward movement, and to close the air ports as those tubes approach the liquid level on their downward movement.

It will here be apparent that the apparatus described accomplishes the positively time-controlled treatment of the milk in the conduit, the time period being regulated by the speed rotation of the conduit, and without possibility of intermixture of the milk in one batch with that of another batch, as the successive batches are positively separated at all times by the crest of the revolving drum and bottom wall of the conduit.

There is further advantage in the constant slow movement of the conduit walls in relation to the batches of milk which pass through them by gravital flow. This moving relation of the walls to the relatively stationary body of milk accomplishes a constant movement of the batches within themselves, aided by the passage through the body of liquid by the agitating blades 14.

In the modified structure illustrated in Fig. 7, is shown a conduit construction comprising circular flat coils 70 connected in similation of a helical conduit by means of the lateral openings 71 and the angular partitions 72 between the coils. Elongated hand hole openings over the connecting passages are indicated at 73, preferably round hand hole openings at other points about the coils are indicated at 74. This modified construction has some advantage in manufacture.

I claim as my invention:

1. In apparatus of the class described, a conduit adapted for the passage of liquid therethrough, said conduit having an opening giving access thereto, a closure normally secured in said opening and a blade mounted on said closure extending into said conduit adapted to agitate the liquid passing therethrough.

2. In apparatus of the class described, a drum adapted to contain heat exchange fluid and supported for rotation about its longitudinal axis, an end closure for said drum having an outwardly extending portion with its outer periphery in concentric relation to the axis of said drum, said extended portion having a series of radially opening ports, a stationary casing having an operating bearing upon the outer periphery of said extending portion, there being a peripheral groove formed between said extended portion and said casing adapted to interconnect said ports, said casing having an inlet opening therethrough communicating with said peripheral groove, a tube positioned axially in said end closure, a retaining disc bearing upon said casing and positioned about said tube, and a retaining nut mounted on said tube in bearing relation to said disc.

In witness whereof I have hereunto attached my signature.

JOSEPH H. GODFREY.